Patented Oct. 6, 1953

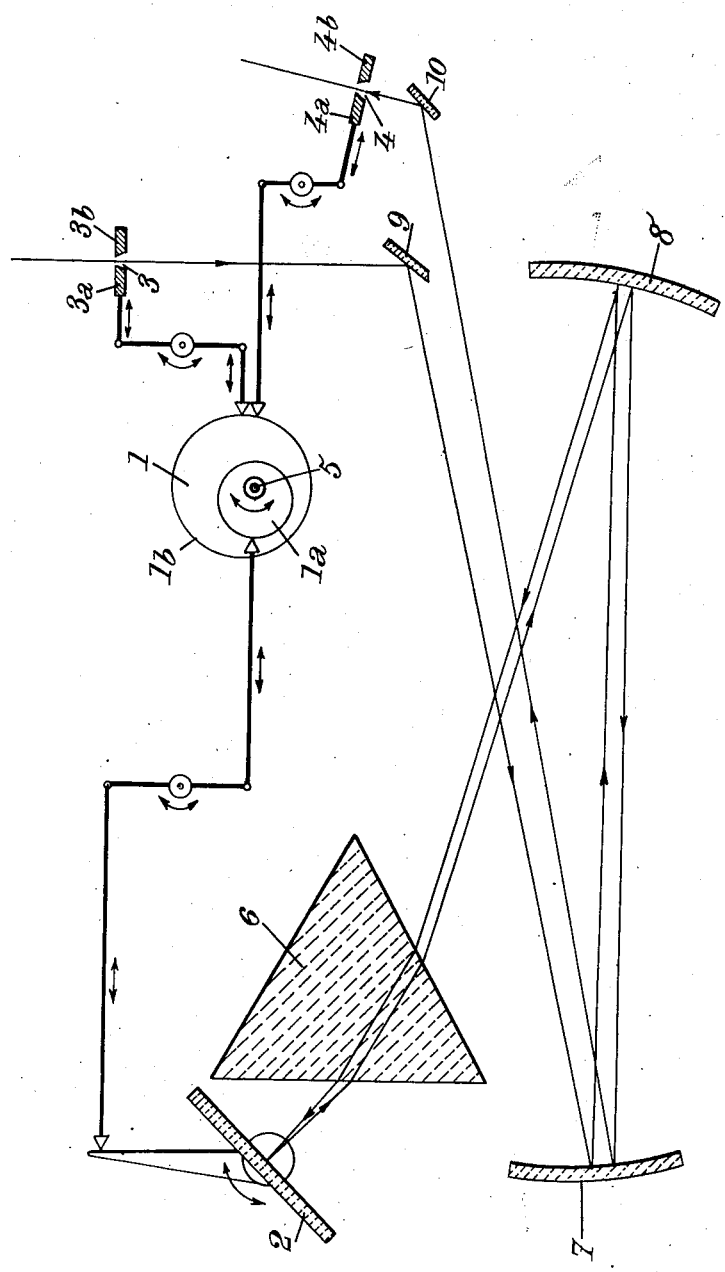

2,654,287

UNITED STATES PATENT OFFICE 2,654,287

SPECTROPHOTOMETER

Karl Luft, Toulouse, France, assignor to "Office National d'Etudes et de Recherches Aeronautiques" (O. N. E. R. A.), Paris, France, a society of the Republic of France Application July 18, 1949, Serial No. 105,401
In France July 13, 1948

3 Claims. (Cl. 88—14)

The present invention relates to spectrophotometers and more particularly spectrophotometers for making measurements in the infra-red range.

Its object is to provide a spectrophotometer which is better adapted to meet the various requirements of practice than those used up to now.

It consists chiefly in providing means for automatically varying the width of the entrance slit and/or that of the exit slit of the spectrophotometer in such manner that over at least a substantial portion of the range of wavelengths to be studied, the practical resolving power follows a law which is a predetermined, continuous and monotonous function of the wavelength.

A second feature consists in actuating in such manner the means which determine the rate of scanning, for the various zones of the spectrum that, at least over a substantial portion of the range of wavelengths to be studied, equal slit spectral widths are scanned in equal times, the slit spectral width being the space occupied in the spectrum by the monochromatic image of the entrance slit.

A third feature consists in fitting the spectrophotometer with an optical system constituted by two spherical mirrors inclined in opposite directions with respect to each other, this system having for its effect to compensate for aberration of the first order.

A preferred embodiment of the present invention will be hereinafter described with reference to the accompanying drawings, given merely by way of example and in which:

The only figure diagrammatically shows the means for adjusting the entrance and exit slits and the optical device of a spectrophotometer, according to the invention.

Before entering into a description of the spectrophotometer according to my invention, it should be noted that the width of the entrance and exit slits of a spectrophotometer has already been made to vary so as to keep the output energy at a constant value.

As a matter of fact, in order directly to record in good conditions the opacity of a medium by means of a spectrophotometer inside an important range of wavelengths of the infra-red region, it is generally necessary to compensate for variations of the radiating energy, but if, in order to obtain this compensation, the width of the slits is varied, it is impossible to maintain a simple definition of the practical resolving power RP, which is chiefly determined by the width of the slits.

Now, if it is desired to obtain reproducible spectrums, it is necessary to define without ambiguity the practical resolving power in every region of the spectrum. This condition is in fact necessary because, the slit spectral widths used in the infra-red range being of the same order of magnitude as the band widths, the values obtained for opacity depend to a considerable degree upon these slit widths and, consequently, upon the practical resolving power which is related thereto.

This is why, according to the main feature of the present invention, the width of the entrance slit and/or that of the exit slit are made to vary automatically in such manner that the practical resolving power of the spectrophotometer varies according to a law which is a predetermined continuous and monotonous function of the wavelength.

In this way, I obtain a uniform reproducibility of the spectrums obtained by means of apparatus of standard construction and the results of measurements obtained with one of these apparatus can be used for all the others. In some cases, for instance in the case of absorption spectrums obtained by means of prisms of sodium chloride or of potassium chloride, adjustment of the width of the slits advantageously takes place in such manner that the practical resolving power is substantially constant over at least an important portion of the range of wavelengths to be studied.

Of course, when this essential feature of the invention is applied, the variation of width of the slits can no longer serve to keep the output energy at a constant value. However, this last mentioned effect can be obtained through other means, for instance through a suitable adjustment device, interposed in the amplification circuit of the spectrophotometer receiver.

It is clear that this essential feature of my invention can be carried out in many different ways. According to the embodiment illustrated by the drawing, I provide a cam device 1 between, on the one hand, the means for operating the movable part, for instance a movable mirror 2, the position of which determines which portion of the spectrum is being examined at a given time, this portion corresponding to a given wavelength, and, on the other hand, the means for operating the elements which determine the widths of the entrance slit 3 and of the exit slit 4. The means for operating both mirror 2 and the elements which determine the widths of slits 3 and 4 may be constituted by rods and levers as diagrammatically shown by the drawing. These operating means cause, for instance, mirror 2 to pivot about an axis parallel to its plane, whereas they move one of the sliding elements $3a$, $3b$ and $4a$, $4b$ between which slits 3 and 4 are formed, or, preferably, both elements $3a$, $3b$ and $4a$, $4b$ simultaneously and in opposite directions. I obtain a simultaneous displacement of mirror 2 and of the sliding elements the movement of which determines the width of slits 3 and 4 by rotating cam device 1 about an axis 5, the shape of the cams being chosen such that the practical resolving power, which depends upon the width of slits 3 and 4, is constant for every wavelength (determined by the position of mirror 2).

The optical system to which mirror 2 belongs and which serves to convey the rays which enter the spectrophotometer through entrance slit 3 toward the exit slit 4 after they have passed through prisms 6, may be arranged in any suitable manner.

However, according to another feature of the invention, this optical system includes two spherical concave mirrors 7 and 8 inclined in opposite directions with respect to the central ray, in such manner as to compensate for the aberration of the first order.

I therefore obtain a highly satisfactory optical system, which is necessary in order to obtain the desired value of the resolving power. If parabolic mirrors were used, difficulties would be experienced which are avoided through the use of spherical mirrors.

These spherical mirrors, after having made the light rays parallel, reflect them toward said prism 6 through which they pass, to be reflected by movable mirror 2. Then the rays pass a second time through prism 6, are again reflected by mirrors 8 and 7 to be finally directed toward the exit slit 4. Auxiliary mirrors 9 and 10 are provided respectively after entrance slit 3 and before exit slit 4 in order respectively to reflect the rays entering through slit 3 toward optical device 7, 8, 6 and 2 and to reflect the rays issuing from this optical device onto exit slit 4.

It should be noted that, if prism 6 is a rock salt prism and if the ray source is a Nernst filament heated to a temperature of 2,200° C., the output energy, for a slit variation ensuring a constant value of the practical resolving power, varies by at most 100% for wavelengths ranging from $15\mu$ to $3\mu$.

Another feature of my invention is intended to ensure, for a given time of response and a given precision of the recorder, a minimum time of recording and a minimum length of displacement of the recording paper for the whole spectrum, without any portion thereof being neglected.

For this purpose and according to this last mentioned feature, the means which determine the rate of scanning for the various zones of the spectrum are controlled in such manner that, for the whole range of wavelengths to be studied, equal slit spectral widths are scanned in equal times.

As above stated, the slit spectral width is the space occupied in the spectrum by the monochromatic image of the entrance slit or, in other words, the interval between wavelengths that cannot be separated from each other since they are covered by the image of the slit.

When the speed of revolution of shaft 5 and the rate of displacement of the recording paper are constant (these two movements being interrelated), mirror 2 must be given a speed which is the higher as the wavelengths to be examined are greater. For this purpose, I may make use of the cam device 1, keyed on shaft 5, and which includes a cam $1a$ interposed between shaft 5 and the means for actuating mirror 2. A second cam $1b$ which also belongs to cam device 1, serves to control the width of slits 3 and 4. Of course, these two cams $1a$ and $1b$ are arranged in such manner as to comply with the above mentioned predetermined law of variation of the practical resolving power, according to the main feature of the invention.

When I ensure both constancy of the resolving power (condition I) and constancy of the time in which equal slit spectral widths are scanned (condition II), I obtain, for the representation of the spectrum, a logarithmic scale of wavelengths. This results from the following equations:

The practical resolving power is:

$$\frac{\lambda}{\Delta\lambda_s}$$

The first condition is therefore expressed as follows:

$$\frac{\lambda}{\Delta\lambda_s}=R_1$$

a constant value.

Let us express the second condition:

On the recording diagram, the abscissa $x$ relative to a given wavelength is a function of the wavelength $$x=f(\lambda)$$

the spectrum width of a slit represented on the diagram is therefore:

$$\Delta x_s = f'(\lambda)\Delta\lambda_s$$

If $v$ is the rate of unwinding of the diagram recording paper at the point of abscissa $x$, one has, if $\Delta t$ is the time of scanning of the slit image:

$$\Delta t = \frac{\Delta x_s}{v}$$

According to condition II.

$$\Delta t = R_2$$

a constant value.

On the other hand, as it is practically difficult to vary the rate of driving of the paper on which the diagram is recorded, it is practically necessary, as already above indicated, to set the following practical condition:

$$v=\frac{dx}{dt}=R_3$$

a constant value.

Condition II therefore gives:

$$\Delta t = \frac{\Delta x_s}{v}=\frac{\Delta x_s}{R_3}=\frac{f'(\lambda)\Delta\lambda_s}{R_3}=R_2$$

and therefore:

$$f'(\lambda)\Delta\lambda_s = R_2.R_3$$

a constant value.

Let us replace $\Delta\lambda_s$ by its value given by condition I:

$$\Delta\lambda_s=\frac{\lambda}{R_1}$$

therefore:

$$f'(\lambda).\lambda = R_1.R_2.R_3 = \text{a constant value } K$$

and consequently:

$$\frac{dx}{d\lambda}.\lambda = K$$

$$dx = K\cdot\frac{d\lambda}{\lambda}$$

$x = K \log \lambda + $ a constant value, which shows that I truly obtain a logarithmic scale of the wavelength for the representation of the spectrum.

The advantages of my invention consist in particular in that the record of the absorption curves that is obtained is both reproducible and quickly obtained.

In the specification and claims, the practical resolving power is defined as follows:

$$R = \frac{\lambda}{\Delta \lambda_s}$$

In this expression $\lambda$ designates the wavelength to be examined at a given time, whereas $\Delta \lambda_s$ is the range of different waves having as their mean value the wavelength $\lambda$ and which actually pass through the slits of the spectrophotometer. When $\lambda$ is, for instance, equal to $10\mu$ and $\Delta \lambda_s$ equal to $\frac{1}{200}\mu$ that is to say, when the difference between the minimum and maximum values of the wavelengths which pass through the slit and which are on either side of the mean value $10\mu$, is equal to $\frac{1}{200}\mu$, $$\frac{\lambda}{\Delta \lambda_s}$$

is equal to 2000. It is this ratio of 2000 which, according to the invention, must remain approximately constant for substantially the whole range of wavelengths.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A spectrophotometer of the type described which comprises, in combination, means forming an entrance slit for an incoming light beam, adjusting means for varying the width of said slit, means for dispersing said beam into its elementary beams of different wavelengths, means forming an exit slit for said elementary beams, adjusting means for varying the width of said exit slit, means for successively directing said elementary beams toward said exit slit, means for operatively connecting said beam directing means with said means for adjusting said exit slit, said connecting means including means coordinating the operation of said slit varying means with said beam directing means to provide a constant practical resolving power defined by the following relationship:

$$R = \frac{\lambda}{\Delta \lambda_s}$$

where R, the resolving power, is constant; $\lambda$ is the wavelength of the mean value of the spectral portion instantaneously passing through said exit slit; and $\Delta \lambda_s$ is the range of the wavelength band in said spectral portion having as their mean value the wavelength $\lambda$.

2. A spectrophotometer according to claim 1 in which the said means for successively directing said elementary beams toward said exit slit include means for operating said directing means at a rate such that, for any one value of wave length $\lambda$, the associated wave length band $\Delta \lambda_s$ passes the exit slit in a time interval equal to that for another wave length band associated with another value of $\lambda$.

3. A spectrophotometer according to claim 1 in which both of said adjusting means are operatively connected to said beam directing means.

KARL LUFT.

References Cited in the file of this patent

UNITED STATES PATENTS

| Number | Name | Date |
|---|---|---|
| 1,964,365 | Razek et al. | June 26, 1934 |
| 2,227,510 | Pineo | Jan. 7, 1941 |
| 2,458,973 | Barnes | Jan. 11, 1949 |
| 2,499,322 | Mather et al. | Feb. 28, 1950 |

OTHER REFERENCES

Journal of the Optical Society of America, vol. 35, No. 12, December 1945, pages 743 to 754. Photostatic copy in class 250, subclass 43.

Harrison et al., "Practical Spectroscopy," page 28, published by Prentice-Hall Inc., New York, 1948. Copy in Division 7.

Candler, "Practical Spectroscopy," pages 120, 121, published by Hilger and Watts, London. Copy in Division 7.